Patented Dec. 22, 1925.

1,566,420

UNITED STATES PATENT OFFICE

ALADAR PACZ, OF CLEVELAND, OHIO.

MOLD COMPOSITION.

No Drawing.   Application filed October 2, 1924. Serial No. 741,274.

*To all whom it may concern:*

Be it known that I, ALADAR PACZ, a citizen of the United States, residing at Cleveland, in the county of Cuyahoga and State of Ohio, have invented certain new and useful Improvements in Mold Composition, of which the following is a specification.

This invention relates to a composition of matter of general utility, and of particular utility in the making of molds and parts thereof for the casting of metals. It also relates to a granular silicon containing mold material which is a relatively good heat conductor and which is characterized by being substantially non-rusting, of approximately the same specific gravity, as the material of sand molds for casting metals, and by having variable heat conducting capacities ranging between that of a sand mold and that of a metal mold.

It further relates to a mold or parts thereof comprising granular relatively good heat conducting silicon containing material for use in casting metals, particularly aluminum silicon alloys.

My improved composition of matter comprises in its simplest form granular relatively good heat conducting silicon containing material and granular or finely divided binding material mechanically mixed together. Although heat conducting material of different compositions may be employed, I prefer to employ principally metallic silicides, which are substantially non-rusting, crushable, cheaply and readily obtainable, and possessing a sufficient quantity of metallic constituents to conduct heat therethrough at a relatively rapid rate, as compared, for example, with sand. As examples of various silicides embodying my invention I may mention ferro-silicon with a silicon content ranging from about 50% to upwards of 90%, a combination of aluminum and iron silicon, aluminum silicon, calcium silicon, and any of these or other silicides, with additional metallic ingredients present in percentages varying from mere impurities to substantial parts thereof.

I may also employ with any one or more of the heat conducting silicon containing materials aforementioned, other materials of greater or less specific gravity or of better or poorer heat conducting capacities. For example, I may substitute molding sand for ferro-silicon to lighten the mixture and to decrease its heat conducting capacity. Or I may substitute carbonaceous material such as carbon, coke, carborundum, graphite, etc., to increase the heat conducting capacity of the mixture. Various other substances such as powdered aluminum and other good heat conducting metals may be compounded with one or more of the foregoing silicon containing materials to form a composition comprehended by my invention.

The binding material may likewise be of variable composition but I have found that the ordinary clay and similar binding materials, at present used for the purpose of assisting sand to retain a molded form, may be employed with the granular heat conducting material above described.

The term "silicide" as used in this application is employed to describe compounds of silicon with some metal, such as iron, aluminum, etc., and is used in the sense that the composition described is not necessarily a true chemical compound.

Although the composition of matter of my invention may be employed for various uses, it is particularly useful when formed into molds or mold parts for casting metals. Molds or mold parts for casting metals composed of my composition of matter possesses heat conducting properties, which range between that of molds composed of sand and that of molds composed of iron, that is, the mold cools the metal being cast therein more quickly than a sand mold and less quickly than an iron mold. By varying the ingredients of such a mold, the heat conducting capacities can be correspondingly varied so that the mold will cool the metal being cast nearly as rapidly as an iron mold, or only slightly more rapidly than a sand mold. Molds composed of my improved composition of matter enable me to produce castings which have a fine grained structure, which are substantially free from porosity and pin holes, and which possess improved physical properties, as compared with metals cast in sand molds. Various metals and alloys may be improved by being cast in my molds. For example, an aluminum alloy containing 5% of copper, about 2% of iron and ½% of titanium gave, when cast in a sand mold, a tensile strength of about 20,000 pounds per square inch and about 1% elongation in two inches, and when cast in a mold of my composition, a tensile strength of about 24,000 pounds per square inch and an elongation of about 4%. An aluminum alloy containing about 8% copper and about 2% iron gave 18,000 pounds per square inch and 1% elongation in two inches when cast in sand and 22,000 pounds per square inch tensile strength and 2% elongation when cast in molds of my composition. Aluminum alloys containing zinc or magnesium have also shown correspondingly increased strength and elongation when cast in molds of my composition over values of the alloys when cast in sand molds. Alloys of the duralumin series, and aluminum alloys containing about 2% manganese and 1% copper have also been improved when cast in molds of my composition as contrasted with the same properties when cast in sand molds. Zinc base die casting alloys and even the iron composition ordinarily known as cast iron are similarly improved.

Aluminum silicon alloys in particular are improved by being cast in molds of my composition. With aluminum silicon alloys which have had their crystal structure modified by any one of the well known "modifying" methods my mold composition is of peculiar importance. The modified character of the crystal structure of such alloys and the results thereof appear to be retained longer during remelting and recasting operatings when cast in molds of my composition than when cast in sand molds. A direct result of this action of the mold is to retain the modified character of the metal longer, or to permit the use of less sodium or sodium containing compounds in the modifying treatment without substantially effecting the modified character of the metal being cast, or both.

In practicing my invention I may mix about 10% of a clay commonly used as a binding material in sand molds with about 90% of ferro-silicon which has previously been crushed to substantially the same granular size as that of the ordinary sands used for sand molds. These materials are then formed into the desired mold shaped in the ordinary manner after which molten metal may be cast in the mold and later separated from the mold material. Ferro-silicon containing about 85% of silicon has been found satisfactory for molds embodying my invention but good results may be obtained with a lower silicon content. The molds employed when the above mentioned physical properties were obtained in aluminum copper iron alloys were composed of substantially 10% binder and 90% ferro-silicon containing about 85% of silicon. Molds composed of 90% of such material and 10% of clay have about the same weight or specific gravity as the ordinary sand mold material and possess heat conducting capacities considerably higher than sand molds and approaching that of iron molds.

Although I have described the use of ferro-silicon in some detail, I have done so not with the intension of limiting my invention thereto but merely to illustrate the invention in connection with a substance which is commercially produced in relatively large quantities and is easily and cheaply obtainable. Other electric furnace products, for example aluminum iron silicon would likewise come within the scope of my invention and for certain purposes might prove superior to the ordinary ferro-silicon.

My improved composition of matter possesses the additional advantage that when it has served the intended purpose, whether it be as a mold material or some other purpose, it may be disposed of to iron manufacturers and the ferro-silicon therein utilized.

Where hereinabove I have employed the term "mold parts" I have intended to include cores as well as other parts of molds. Cores of my composition may be used with other mold parts of various compositions. For example, such a core can be used with a metal mold to form what is commonly known as a semi-permanent mold. Other similar combinations will suggest themselves to those skilled in the art.

Having thus described my invention, what I desire to secure by Letters Patent is defined in what is claimed, it being understood that the foregoing examples have been given for purposes of illustration and not with the intention of defining the limits of my invention.

What is claimed is:

1. A composition of matter comprising metallic silicon containing material and a binding material, both in finely divided form, and intimately mixed with each other.

2. A composition of matter comprising granular, relatively good heat conducting non-rusting silicon containing material and a finely divided binding material intimately mixed therewith.

3. A composition of matter comprising a granular metallic silicide and finely divided clay intimately mixed therewith.

4. A composition of matter comprising a granular, non-rusting, iron silicide and finely divided clay intimately mixed therewith.

5. A composition of matter for molds for casting metals comprising a granular, metallic silicide and a finely divided clay binding material.

6. A composition of matter for molds for casting aluminum silicon alloys comprising a granular, non-rusting, iron silicide and a finely divided clay binding material mixed therewith.

7. A composition of matter comprising a metallic silicide and a binding material, the silicide forming about 90% and the binding material about 10% of the composition.

8. A composition of matter comprising a granular, non-rusting, metallic silicide containing up to about 90% of silicon and a finely divided binding material, the silicide constituting about 90% of the composition.

9. A composition of matter for molds for casting aluminum silicon alloys comprising a granular, non-rusting metallic silicide containing between about 50% and about 90% of silicon and a finely divided binding material, the binding material constituting about 10% of the composition.

10. A mold for casting metals composed of granular silicon containing material and finely divided binding material and characterized by possessing the property of conducting heat away from the metal being cast in contact therewith at a relatively rapid rate as compared with that of a sand mold and approaching that of an iron mold.

11. A mold for casting metals composed of granular silicon containing material and a finely divided binding material and characterized by having substantially the same specific gravity as sand mold material and by possessing the property of conducting heat away from the metal being cast in contact therewith at a rate more rapidly than a sand mold and more slowly than an iron mold.

In testimony whereof I hereunto affix my signature this 24th day of September, 1924.

ALADAR PACZ.